(12) United States Patent
Hinski

(10) Patent No.: US 8,817,339 B2
(45) Date of Patent: Aug. 26, 2014

(54) HANDHELD DEVICE DOCUMENT IMAGING

(71) Applicant: Top Image Systems Ltd., Ramat-Gan (IL)

(72) Inventor: Yuval Hinski, Ramat-Gan (IL)

(73) Assignee: Top Image Systems Ltd., Ramat-Gan (IL)

( * ) Notice: Subject to any disclaimer, the term of this patent is extended or adjusted under 35 U.S.C. 154(b) by 0 days.

(21) Appl. No.: 13/745,806

(22) Filed: Jan. 20, 2013

(65) Prior Publication Data

US 2014/0055826 A1 Feb. 27, 2014

Related U.S. Application Data

(60) Provisional application No. 61/691,830, filed on Aug. 22, 2012.

(51) Int. Cl.
*H04N 1/04* (2006.01)

(52) U.S. Cl.
USPC ........... 358/474; 358/450; 358/473; 382/212; 348/231.5

(58) Field of Classification Search
CPC . H04N 1/2112; H04N 1/32128; H04N 5/378; H04N 5/77; H04N 9/8205; H04N 2101/00; H04N 2201/0084; H04N 21/44008; H04N 21/4402; H04N 5/20; H04N 5/57; H04N 9/68; H04N 3/38; H04N 3/40; H04N 5/04; H04N 5/0675; H04N 7/08; G01C 11/04; G06T 3/4038

USPC ............... 358/1.9, 450, 453, 540, 474, 473; 382/284, 294, 309, 212, 213, 285, 282; 348/231.5, 159, 36, 239, 42, 218.1
See application file for complete search history.

(56) References Cited

U.S. PATENT DOCUMENTS

| | | | | |
|---|---|---|---|---|
| 2,409,488 | A * | 10/1946 | Homrighous | 358/425 |
| 6,173,087 | B1 * | 1/2001 | Kumar et al. | 382/284 |
| 6,434,280 | B1 * | 8/2002 | Peleg et al. | 382/299 |
| 6,834,128 | B1 * | 12/2004 | Altunbasak et al. | 382/284 |
| 7,176,960 | B1 * | 2/2007 | Nayar et al. | 348/207.99 |
| 7,317,558 | B2 * | 1/2008 | Chiba | 358/450 |
| 7,668,366 | B2 * | 2/2010 | Bhaskaran et al. | 382/164 |
| 7,773,126 | B1 * | 8/2010 | Lee et al. | 348/231.5 |
| 7,809,212 | B2 * | 10/2010 | Tulkki | 382/284 |
| 7,889,948 | B2 * | 2/2011 | Steedly et al. | 382/294 |
| 8,116,563 | B2 * | 2/2012 | Mitsunaga | 382/169 |
| 2010/0073735 | A1 | 3/2010 | Hunt et al. | |

\* cited by examiner

*Primary Examiner* — Negussie Worku

(57) ABSTRACT

A method of stitching frames of a video sequence to image a target document. The method comprises capturing a group of frames of a video sequence using an image sensor of a handheld device having a display, during the capturing, analyzing the video sequence to select iteratively a group of the frames, each member of the group depicts another of segments of a target document, during the capturing, sequentially presenting a plurality maneuvering indications, each the maneuvering indication is presented after a certain frame depicting a certain of the segments is captured and indicative of a maneuvering gesture required for bringing the image sensor to capture another frame depicting another segment of the segments, the another segment being complementary and adjacent to the certain segment, and stitching members of the group to create a mosaic image depicting the target document as a whole.

18 Claims, 5 Drawing Sheets

HANDHELD DEVICE DOCUMENT IMAGING

RELATED APPLICATION

This application claims the benefit of priority under 35 USC §119(e) of U.S. Provisional Patent Application No. 61/691,830 filed Aug. 22, 2012. The contents of the above application are all incorporated by reference as if fully set forth herein in their entirety.

BACKGROUND

The present invention, in some embodiments thereof, relates to document imaging and, more specifically, but not exclusively, to methods and systems of using a handheld device for imaging documents.

Scanners are traditionally and widely used in document image capturing for document analysis systems, like optical character recognition (OCR). Scanners produce planar document images with a high resolution. During the last years, cameras are widely available at low cost. These cameras offer fast and flexible document imaging.

For example, U.S. Patent Application Publication No. 2010/0073735 teaches a process and a system to transform a digital photograph of a text document into a scan-quality image is disclosed. By extracting the document text from the image, and analyzing visual clues from the text, a grid is constructed over the image representing the distortions in the image. Transforming the image to straighten this grid removes distortions introduced by the camera image-capture process. Variations in lighting, the extraction of text line information, and the modeling of curved lines in the image may be corrected.

SUMMARY

According to an aspect of some embodiments of the present invention there is provided a method of stitching a plurality of frames of a video sequence to image a target document, the method comprises capturing a group of a plurality of frames of a video sequence using an image sensor of a handheld device having a display, during the capturing, analyzing the video sequence to select iteratively a group of the plurality of frames, each member of the group depicts another of a plurality of segments of a target document, during the capturing, sequentially presenting a plurality maneuvering indications, each the maneuvering indication is presented after a certain frame depicting a certain of the plurality of segments is captured and indicative of a maneuvering gesture required for bringing the image sensor to capture another frame depicting another segment of the plurality of segments, the another segment being complementary and adjacent to the certain segment, and stitching members of the group to create a mosaic image depicting the target document as a whole.

Optionally, the members are selected sequentially, each the member is stitched to another member before a further another member is selected.

More optionally, the method further comprises identifying at least one dimension of the target document, wherein the plurality maneuvering indications are set to instruct the user to maneuver the handheld device along a scanning pattern that is adapted to the at least one dimension.

Optionally, the analyzing comprises detecting a first frame depicting a corner of the document and using the first frame to generate at least one of the plurality of maneuvering indications.

Optionally, the presenting comprises presenting instructions to align the handheld device in relation to the target document.

More optionally, the method further comprises estimating a current motion direction of the handheld device during the capturing; wherein each member of the group is stitched to another member during the capturing according to the current motion direction.

Optionally, the plurality of segments comprises the mosaic image when arranged in a crisscross manner, one row of segments on top of the other.

More optionally, the analyzing comprises detecting a first frame depicting a corner of the document and using the first frame as a trigger to generate a maneuvering indication of the plurality of maneuvering indications which indicates to a user to capture a second frame depicting a segment from another row of segments.

More optionally, the plurality of maneuvering indications comprise a plurality of arrows which are sequentially presented on a display of the handheld device to indicate to the user to guide the handheld device along a scanning pattern.

More optionally, the method further comprises automatically identifying a plurality of characters in the mosaic image.

Optionally, the analyzing comprises selecting the certain frame after removing a blur therefrom.

Optionally, the analyzing, the presenting, and the stitching are automatically performed.

Optionally, the stitching comprises normalizing the mosaic image.

Optionally, the stitching comprises binarizing the mosaic image.

According to an aspect of some embodiments of the present invention there is provided a handheld device of stitching a plurality of frames of a video sequence to image a document. The device comprises an image sensor which captures a group of a plurality of frames of a video sequence, a display, a processor, an analysis module which uses the processor to analyze the video sequence to select iteratively a group of the plurality of frames, each member of the group depicts another of a plurality of segments of a document, a maneuvering indication module which sequentially presents a plurality maneuvering indications during the capturing, each the maneuvering indication being presented on the display after a certain frame depicting a certain of the plurality of segments is captured and indicative of a maneuvering gesture required for bringing the image sensor to capture another frame depicting another segment of the plurality of segments, the another segment being complementary and adjacent to the certain segment, and a stitching module which stitches the plurality of segments to create a mosaic image depicting the document as a whole.

Optionally, the handheld device is a cellular phone.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
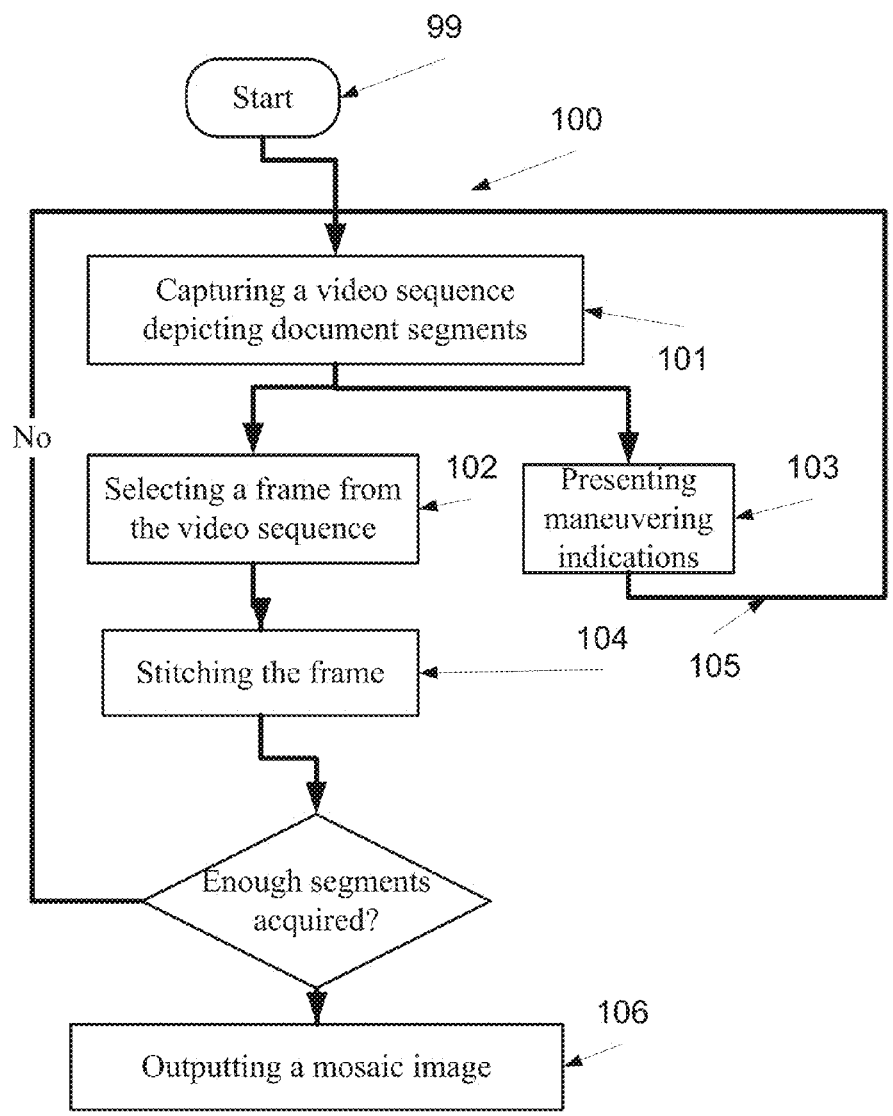
FIG. 1 is a flowchart of a method of stitching frames which are selected from a video sequence captured while a user maneuvers a handheld device to image a document according to a set of maneuvering indications which are dynamically presented thereto, according to some embodiments of the present invention.

The present invention, in some embodiments thereof, relates to document imaging and, more specifically, but not exclusively, to methods and systems of using a handheld device for imaging documents.

According to some embodiments of the present invention, there are provided methods and handheld devices for generating a mosaic image of a target document by stitching a plurality of frames selected from a video sequence that is captured while a user maneuvers a camera based handheld device according to maneuvering indications. Each maneuvering indication is optionally generated according to the last frame which is selected for stitching, providing real time adaptive instructions which guide a user in a scanning pattern, which is optionally adapted to the one or more dimension of the imaged target document. The methods and handheld devices allow capturing a higher resolution mosaic image of a document using frames or relatively low resolution. In use, the user is instructed to maneuver the handheld device along a certain path in front of the imaged document, optionally without stops in an intuitive manner. The mosaic image may then be processed to identify characters in the target document.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, non-transitory computer readable storage media such as, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
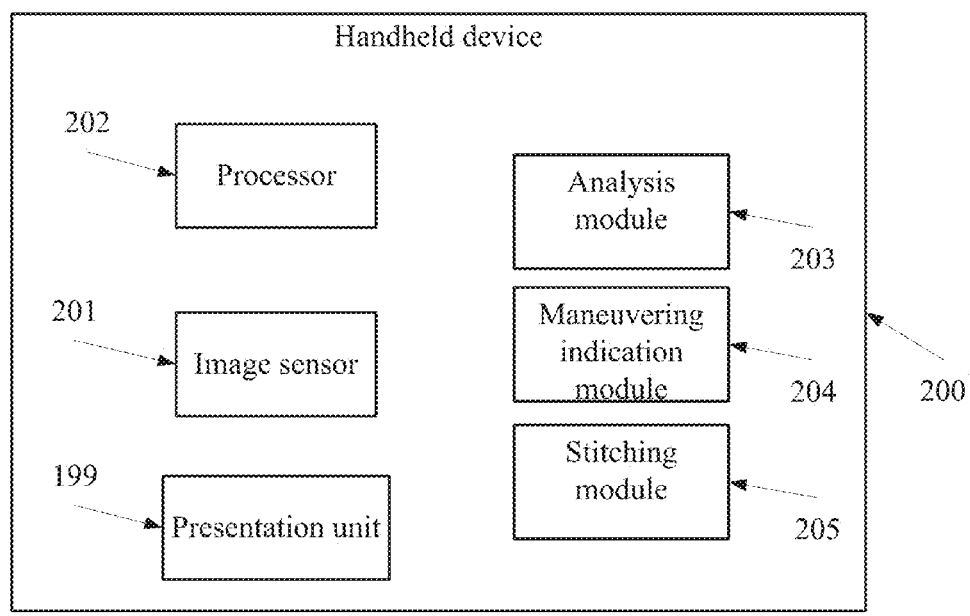
FIG. 2 is a schematic illustration of hardware and software components of an exemplary handheld device that is used for stitching frames of a video sequence, for example based on the method depicted in FIG. 1, according to some embodiments of the present invention.

Reference is now made to FIG. 1 which is a flowchart of a method 100 of stitching a group of frames which are selected from a video sequence captured while a user maneuvers a handheld device to image a target document according to a set of maneuvering indications which are dynamically presented thereto, according to some embodiments of the present invention. Reference is also made to FIG. 2, which is a schematic illustration of hardware and software components of an exemplary handheld device 200 that is used for stitching frames of a video sequence, for example based on the method depicted in FIG. 1, according to some embodiments of the present invention. The exemplary handheld device 200, which is optionally a cellular device, such as a Smartphone, and/or a tablet, includes an image sensor 201, such as an integrated camera, a complementary metal-oxide-semiconductor (CMOS) based sensor and/or a charge coupled device (CCD) based sensor. The exemplary handheld device 200 further includes a presentation unit, such as a display 199 and/or a tactile surface and/or speakers and a processor 202, for example an integrated processor 202 such as a Quad Core a reduced instruction set computer (RISC) instruction set architecture (ISA) (ARM) Processor. The exemplary handheld device 200 hosts a number of software components 203, 204, 205, optionally as part of an installed application. The software components 203, 204, 205 may be separate modules and/or a unified module that includes sub modules and/or functions. For example, the software components include an analysis module 203, a maneuvering indication module 204, and a stitching module 205 which the operation thereof is exemplified below.

The method 100 and handheld device 200 allow stitching frames which depict portions of a target document in various sizes, for example A4, A3, A2 and/or a letter size to create a mosaic image of the target document. The stitching allows using frames, which are captured from a relatively limited distance from a target document, with relatively low spatial resolution, for forming a mosaic image that images the target document in a higher spatial resolution. It should be noted that even if the frames are captured in a high resolution, for example a video feed is a high-definition (HD), the mosaic image will image the target document in a higher spatial resolution.

As the frames are extracted from a video sequence, their quality is relatively low in relation to still images and/or scanner images; however, as these frames are continuously captured the user does not have to stop and take still images while maneuvering the handheld device 200 in front of the target document.

Figure 3B:
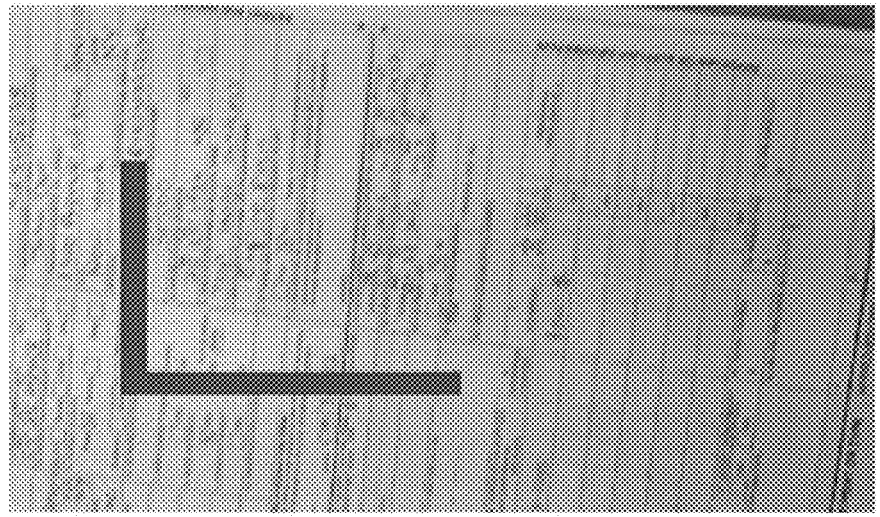
FIGS. 3A-3B are images of exemplary maneuvering indications presented on top of captured frames, according to some embodiments of the present invention.
Figure 3A:
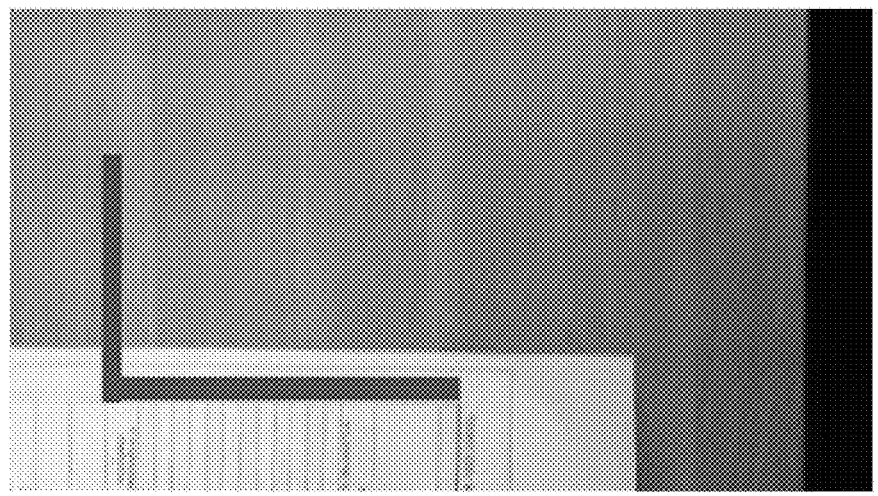

As depicted in FIG. 1, after the process is initiated 99, for instance by activating the process (by the user). First, as shown at 101, a video sequence is captured using the image sensor 201 of the handheld device 200. During the capturing, as shown at 102, the frames of the video sequence are analyzed iteratively to select a group of frames so that each member of the group depicts, optionally in a clear manner, another of a plurality of segments that comprise a mosaic image depicting a target document, such as a form, as a whole. The analysis is optionally performed by the analysis module 203, using the processor 202. Optionally, during the capturing, as shown at 102, the frames of the video sequence are analyzed to instruct the user to align the handheld device 200 in relation to the target document, for example by presenting a edges of a document corner in a desired location, for example as shown at FIGS. 3A-3B. It should be note that the alignment allows capturing a larger portion of the document in each frame so that fewer frames are sampled and stitched without reducing resolution. For example, the user is guided to capture a portion of the document (e.g. the right corner) so that most of the frame is filled with a document portion. This reduces the time it takes the user to capture the required segments of the document. Once the analysis module 203 has detected that the frame is aligned, the user is guided to maneuver the handheld device 200 to the right (or bottom) to start the scanning of the document, for example as described below.

As shown at 103, the user is instructed, while the video sequence is captured, to maneuver the handheld device 200 to capture the segments. The instructions, which are optionally generated by the maneuvering indication module 204, are dynamically updated according to the segments which have been captured. The instructions are optionally a plurality maneuvering indications which are presented sequentially.

Optionally, the maneuvering indications are set according to a scanning pattern that is adapted to one or more dimensions of the target document. These dimensions may be provided by the user and/or selected identified automatically, for example as described below. In real time, each maneuvering indication may be calculated according to the segment of the target document that is imaged in a currently and/or previously captured frame, for example as described below.

Optionally, the maneuvering indication are automatically and sequentially generated and therefore continuously presented on the display 199 while the user maneuvers the handheld device 200. This allows instructing the user how to maneuver the handheld device 200 in a continuous limb movement. In such a manner, the user is only required to maneuver the handheld device 200 in front of the target document without performing any additional action, such as pressing a record and/or approve button.

Figure 3I:
FIG. 3I is an image of an exemplary maneuvering indication indicative of a completion of the segment capturing process, according to some embodiments of the present invention.
Figure 3E:
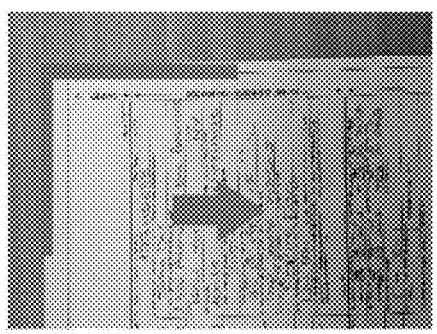
FIGS. 3C-3H are images of exemplary maneuvering indications indicating to a user in which direction she should maneuver a handheld device, according to some embodiments of the present invention.
Figure 3H:
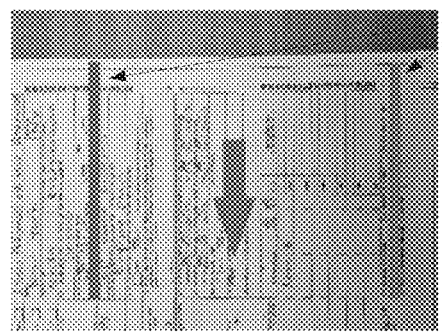
Figure 3D:
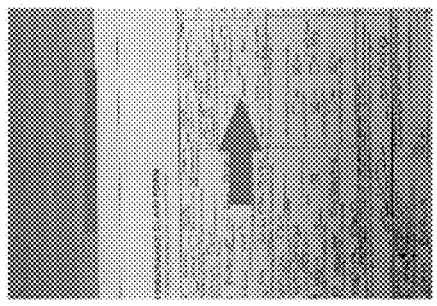
Figure 3G:
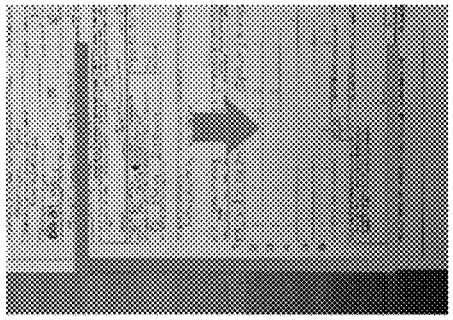
Figure 3C:
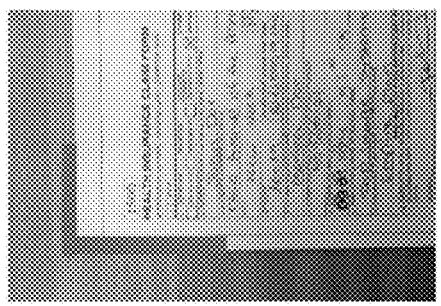
Figure 3F:
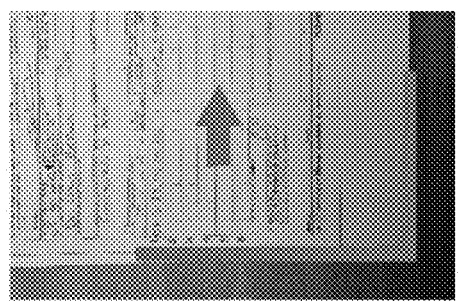

The maneuvering indication is indicative of a maneuvering gesture the user should perform for bringing the image sensor 201 to capture a frame depicting another segment of the target document, optionally adjacent and complementary to the last segment which has been captured by the image sensor 201. For example, as depicted in FIGS. 3A-3B, a maneuvering indication may be a corner marker indicating to a user to maneuver the handheld device 200 so that a certain corner of the document is imaged in a certain location in the captured frame(s). In another example, as depicted in FIGS. 3C-3H, a maneuvering indication may be an arrow indicating to a user in which direction she should maneuver the handheld device 200 so that a desired segment of the document is imaged in a certain location in the captured frame(s). Any other direction point may be used, for example a finger sign. In another example, as depicted in FIG. 3I, a maneuvering indication may be indicative of a completion of the segment capturing process, indicating to a user that he may stop maneuvering the handheld device 200. Other maneuvering indications may also be used, for example vocal and/or tactile instructions indicating direction. Additionally or alternatively, some or all of the edges of a currently captured segment are emphasized, for example see numeral 301. In such a manner, the user receives an indication about the dimensions of the segment which should be captured.

Figure 4:
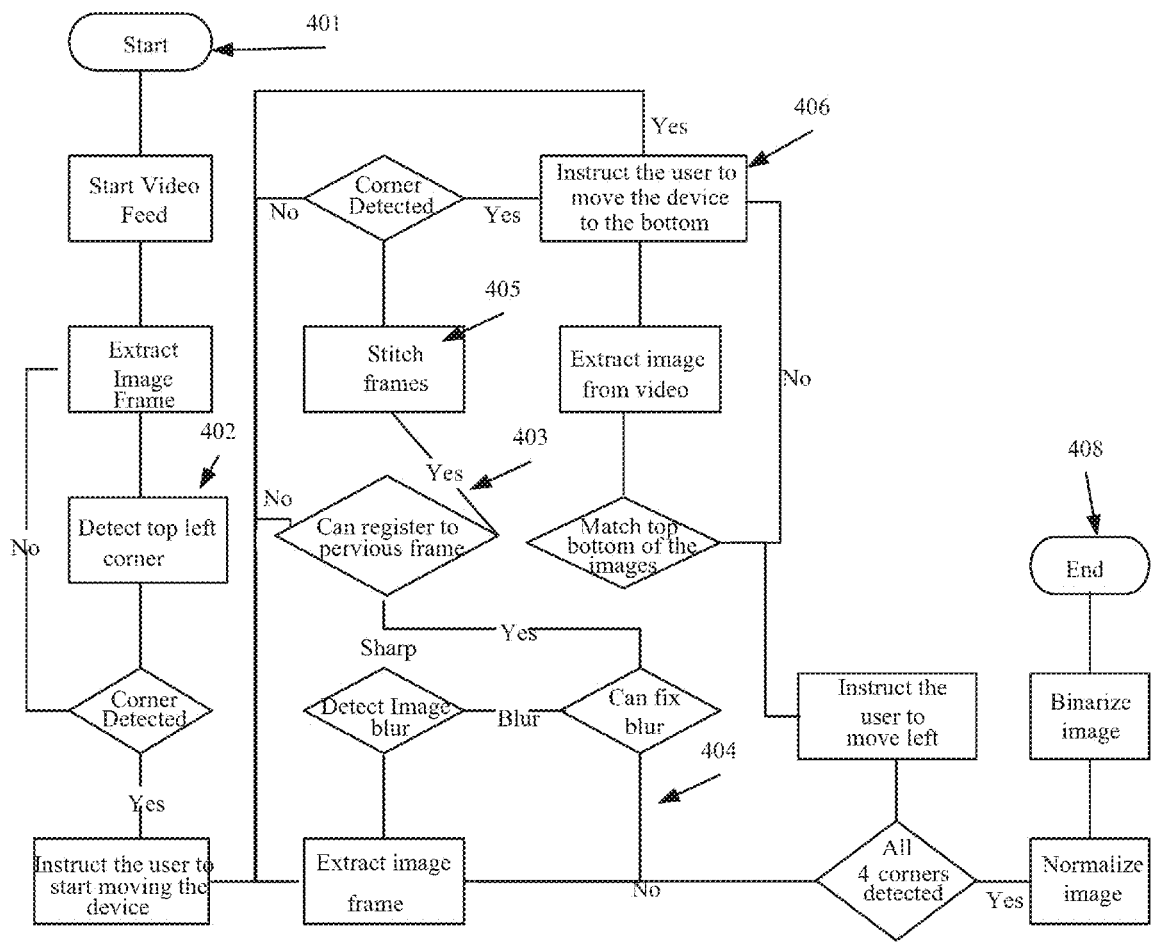
FIG. 4 is an exemplary flowchart of a process of stitching frames from a video sequence to image a target document, according to some embodiments of the present invention.

As shown at 104, the frames which are selected from the video sequence are stitched, for example by the stitching module 205, to create a mosaic image depicting the target document as a whole. Each frame may be stitched after the capturing thereof, optionally iteratively, for instance a current frame to the last captured frame which was extracted from the captured video sequence. Optionally, each frame that is selected as depicting one of the segments of the target document is stitched to a previously selected segment before another segment is selected, for example as depicted in FIG. 4. In such embodiments, a frame is sampled from the video sequence and optionally registered with a previously captured frame. As the handheld device 200 movement is assumed to correspond with the maneuvering indication that is currently presented to the user, the location of one frame in relation to the other may be assumed for improving the stitching process.

Optionally, captured frames may be aligned before stitching, for example according to the orientation of a document segment imaged in a previously captured frame. Optionally, as shown at 101, 102, and 104 frames are selected and stitched until the captured frames image segments that allows outpacing an output mosaic image that image the target document as a whole, as shown at 106.

For example, reference is now also made to FIG. 4, which is an exemplary flowchart 300 of a process of stitching frames from a video sequence to image a target document, according to some embodiments of the present invention. After the process is initiated, as shown at 401, a video sequence, referred to herein as a video feed, is received and analyzed. Optionally, during the initiation the area of the target document is evaluated to determine how many frames should be captured, optionally in which scanning pattern, for example in how many rows. For example, the user may select whether this is an A4, A3, letter, and/or any other document. The area may be detected automatically, for example by capturing an image of the document in relation to a reference object with a known size, such as a credit card.

Frames are sequentially analyzed to detect a document corner, for example a left corner, for instance as shown at FIG. 3A and shown at 402. After this event, the user is instructed to capture complementary segments along a row to the right of the detected segment and as shown at 403, see also FIGS. 3C-3E. If more than one segment has to be captured along this row, this process is iteratively repeated while the user is being notified when to maneuver the handheld device 202. Optionally, as shown at 404, blur is fixed (e.g. reduced) in the captured frames. Optionally, the blur is estimated according to an image analysis and/or an internal accelerometer or a similar gauge of the handheld device 200. Optionally, an estimated movement direction of the handheld device 200, which is assumed to be correlated with the maneuvering indication that is currently presented, is used to remove the blur from the frames.

Optionally, if the blur after the correction is still too high, the frame is ignored. Optionally, if a frame cannot be registered with a previously captured frame(s), the frame is ignored. As shown at 405, each selected frame that may be registered with a fixed blur is stitched to the previously captured frame(s). As shown at 406, the user is instructed to maneuver the handheld device 202 to capture frames depicting another row of document segments. This may be repeated iteratively if the target document is divided to a number of rows of segments. Optionally, once a document edge and/or a bottom corner of the target document is detected; the user is instructed to move the handheld device 200 toward the bottom and/or to a respective side until it captures a frame that images the bottom segment and/or a segment that includes the other corner.

After frames depicting all corners are captured and stitched, a mosaic image may be outputted, for example as shown at 408. The mosaic image may be normalized and/or binarized, optionally to a bi-tonal image, for example as known in the art.

The mosaic image is optionally analyzed to identify characters and converted into a text file, for example using an OCR module that is installed on the handheld device 200.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term a module, a processor, and an image sensors intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4 , from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of stitching a plurality of frames of a video sequence to image a target document, comprising:
    capturing a group of a plurality of frames of a video sequence using an image sensor of a handheld device having a display;
    during said capturing, analyzing said video sequence to select iteratively a group of said plurality of frames, each member of said group depicts another of a plurality of segments of a target document;
    during said capturing, sequentially presenting a plurality of visual maneuvering indications on said display, while said display presents said plurality of frames, each said visual maneuvering indication is presented after a frame depicting a segment of said plurality of segments of said target document is captured and said visual maneuvering indication is indicative of a maneuvering gesture required for bringing said image sensor to capture another frame depicting another segment of said plurality of segments, said another segment being complementary and adjacent to said previous segment; and,
    stitching members of said group to create a mosaic image depicting said target document as a whole.

2. The method of claim 1, wherein said members are selected sequentially, each said member is stitched to another member before a further another member is selected.

3. The method of claim 1, further comprising identifying at least one dimension of said target document, wherein said plurality maneuvering indications are set to instruct said user to maneuver said handheld device along a scanning pattern that is adapted to said at least one dimension.

4. The method of claim 1, wherein said analyzing comprises detecting a first frame depicting a corner of said document and using said first frame to generate at least one of said plurality of maneuvering indications.

5. The method of claim 1, wherein said presenting comprises presenting instructions to align said handheld device in relation to said target document.

6. The method of claim 1, further comprising estimating a current motion direction of said handheld device during said capturing; wherein each member of said group is stitched to another member during said capturing according to said current motion direction.

7. The method of claim 1, wherein said plurality of segments comprises said mosaic image when arranged in a crisscross manner, one row of segments on top of the other.

8. The method of claim 7, wherein said analyzing comprises detecting a first frame depicting a corner of said document and using said first frame as a trigger to generate a maneuvering indication of said plurality of maneuvering indications which indicates to a user to capture a second frame depicting a segment from another row of segments.

9. The method of claim 7, wherein said plurality of visual maneuvering indications comprise a plurality of arrows which are sequentially presented on a display of said handheld device to indicate to said user to guide said handheld device along a scanning pattern.

10. The method of claim 1, further comprising automatically identifying a plurality of characters in said mosaic image.

11. The method of claim 1, wherein said analyzing comprises selecting said certain frame after removing a blur therefrom.

12. The method of claim 1, wherein said analyzing, said presenting, and said stitching are automatically performed.

13. The method of claim 1, wherein said stitching comprises normalizing said mosaic image.

14. The method of claim 1, wherein said stitching comprises binarizing said mosaic image.

15. A non-transitory computer readable storage medium comprising computer executable instructions adapted to perform the method of claim 1.

16. A handheld device of stitching a plurality of frames of a video sequence to image a document, comprising:
   an image sensor which captures a group of a plurality of frames of a video sequence;
   a display;
   a processor;
   an analysis module which uses said processor to analyze said video sequence to select iteratively a group of said plurality of frames, each member of said group depicts another of a plurality of segments of a document;
   a maneuvering indication module which sequentially presents a plurality of visual maneuvering indications on said display, while said display presents said plurality of frames, during said capturing, each said visual maneuvering indication being presented on said display after a frame depicting a segment of said plurality of segments of said document is captured and indicative of a maneuvering gesture required for bringing said image sensor to capture another frame depicting another segment of said plurality of segments, said another segment being complementary and adjacent to said previous segment; and
   a stitching module which stitches said plurality of segments to create a mosaic image depicting said document as a whole.

17. The handheld device of claim 16, wherein said handheld device is a cellular phone.

18. A non-transitory computer readable storage medium encoded with computer executable instructions for performing steps including stitching a plurality of frames of a video sequence to image a document, said steps comprising:
   capturing a group of a plurality of frames of a video sequence using an image sensor of a handheld device having a display;
   analyzing, during said capturing, said video sequence to select iteratively a group of said plurality of frames, each member of said group depicts another of a plurality of segments of a document;
   presenting sequentially, during said capturing, a plurality of visual maneuvering indications, on said display, while said display presents said plurality of frames, each said visual maneuvering indications is presented after a certain frame depicting a certain of said plurality of segments is captured and indicative of a maneuvering gesture required for bringing said image sensor to capture another frame depicting another segment of said plurality of segments, said another segment being complementary and adjacent to said certain segment; and,
   stitching said plurality of segments to create a mosaic image depicting said document as a whole.

* * * * *